United States Patent [19]
Lucas et al.

[11] Patent Number: 4,751,640
[45] Date of Patent: Jun. 14, 1988

[54] AUTOMATED INVESTMENT SYSTEM

[75] Inventors: Barbara Lucas, New Rochelle; Ellen Tarnofsky, New York, both of N.Y.; John J. Ward, III, Summit, N.J.

[73] Assignee: Citibank, NA, New York, N.Y.

[21] Appl. No.: 620,477

[22] Filed: Jun. 14, 1984

[51] Int. Cl.$^4$ .............................................. G06F 15/21
[52] U.S. Cl. ................................................... 364/408
[58] Field of Search ........ 364/408, 407, 200 MS File, 364/900 MS File; 340/825.26; 273/237, 278, DIG. 28, 238

[56] References Cited

U.S. PATENT DOCUMENTS

| | | | |
|---|---|---|---|
| 3,573,747 | 4/1971 | Adams et al. | 364/200 |
| 4,025,760 | 5/1977 | Trenkamp | 364/408 X |
| 4,114,027 | 9/1978 | Slater et al. | 340/825.35 X |
| 4,319,336 | 11/1984 | Anderson et al. | 364/900 |
| 4,321,672 | 3/1982 | Braun et al. | 364/408 |
| 4,376,978 | 3/1983 | Musmanno | 364/900 |
| 4,412,287 | 10/1983 | Braddock, III | 364/200 X |
| 4,484,304 | 3/1982 | Anderson et al. | 364/900 |
| 4,566,066 | 1/1986 | Towers | 364/408 |
| 4,597,046 | 6/1986 | Musmanno et al. | 364/408 |

Primary Examiner—Jerry Smith
Assistant Examiner—Clark A. Jablon
Attorney, Agent, or Firm—Morgan & Finnegan

[57] ABSTRACT

An automated investment system for investment banks which allows their customers to invest idle funds, including odd amounts of funds, throughout the day is disclosed. The cash investment system disclosed is a data processing system which utilizes selected interest bearing and discounted securities and instruments traditionally sold by banks as the basis for a new interest bearing investment vehicle of varying maturities which can be purchased with an odd amount of funds, and without the need to interact with salespeople. The investments and underlying securities and instruments are stored in an inventory file maintained in the bank's data processing facility. A customer reviews the investments being offered on a given day through a terminal located at the customer's facility. When a customer chooses to purchase an investment having a particular maturity and corresponding interest rate for an odd amount of cash, whole fractionalized undivided interests or at least one whole and at least one fractionalized, undivided interests in the securities and instruments in inventory are assigned to match the customer's purchase transaction.

23 Claims, 8 Drawing Sheets

AUTOMATED INVESTMENT SYSTEM

BACKGROUND OF THE INVENTION

The present invention relates to financial systems, and more particularly, to an improved automated investment system for investing idle funds of customers of investment banks.

Very often the Treasurer of a company, or other financial officer responsible for funds of the company, will have on hand large amounts of cash or other funds that are not needed immediately, or in the near future for the operation of the company. In a situation such as this, the officer will seek to put these idle funds to work by depositing them in an interest bearing investment until such time as they are needed. One alternative available to financial officers having a large amount of funds on hand is to invest in the short term investments traded in the repurchase (repo) market. Active during conventional selling times of each business day, i.e., generally the early to late morning hours, this market offers a financial officer the option of purchasing short term investments which reflect an interest in various underlying interest bearing and discounted securities and instruments (hereinafter "securities"), typically not specifically identified. These investments, which are offered by investment banks are sold through salespeople in large, conventional denominations or blocks often equalling or exceeding $500,000. Typically, a limited selection of denominations and a very limited selection of maturities and rates of return are offered.

Thus, for example, if a corporate treasurer receives funds totaling $500,000 on the morning of a given business day and tnese funds will not be utilized by the corporation for several days, the treasurer may put such funds to work by investing tnem in the repo market in a short term investment providing a specified rate of return and having a maturity comparable to the period of time during which the funds will not be needed.

Very often, however, the amount of funds which a financial officer has on hand will be an odd amount, i.e., more or less than the conventional denominations of the securities traded in the repo market. Similarly, very often a Treasurer or financial officer will receive a large amount of cash late in the day, at a time past the normal morning hours during which investment opportunities are available in the repo market. Under such circumstances, the investing officer may find that he is able to invest only a part of his idle funds where the uninvested amount represent an odd amount, or is able to invest none of his idle funds because they were too small or received too late in the day.

By law investment banking arms of commercial banks cannot commingle the funds of customers not involved in a trust relationship with them, preventing them from combining the odd amounts of various customers to arrive at the standard denominations of the securities and repurchase agreements they sell. As a consequence of this, and the legal prohibition against banks paying interest on demand deposit accounts of corporate customers, many financial officers are often left holding a large amount of idle funds which cannot be put to work completely, or in certain instances, at all.

Accordingly, it is a primary object of the present invention to provide an improved investment system for investment banks which, while complying with all applicable banking regulations, allows the banks' customers to invest odd amounts of idle funds which they may have on hand.

It is another object of the present invention to provide an investment system as previously described which allows bank customers to invest their idle funds at unconventional times of the day.

It is a further object of the present invention to provide an investment system as previously described which is automated, and therefore, avoids the need for bank customers to interact with a salesperson.

It is yet another object of the present invention to provide an investment system as previously described which allows bank customers to invest odd amounts of idle funds by purchasing an investment vehicle representing whole and/or fractionalized undivided interests in individual securities and instruments offered by investment banks.

SUMMARY OF THE INVENTION

The present invention is an improved automated investment system for investment banks which allows bank customers to invest any amount of funds, including odd amounts, which exceed a set minimum, at conventional and unconventional selling times of the day. The investment system of the present invention is a data processing system which utilizes selected interest bearing and discounted securities and instruments traditionally sold by banks as the basis for a new interest bearing investment vehicle with various maturities that can be purchased with odd amounts of funds, and without the need to interact with salespeople. The new investment vehicle of the present invention allows a bank to accommodate odd amounts by matching whole and/or fractionalized undivided interests in specifically identified individual securities and instruments such as U.S. Treasury and Agency notes and bonds, municipals, money market instruments, etc., traditionally sold by investment banks, thereby allowing the bank to avoid the problem of commingling funds of customers not involved in a trust relationship.

According to the present invention, various securities and instruments are selected for use in matching the investment purchases of bank customers. Corresponding with this selection, a series of investment vehicles, having varying maturity periods and rates of return, are made accessible to bank customers for investing their funds. The data describing these investments and identifying the underlying securities are stored in an inventory file resident in the data processing facility of the bank.

Data describing the available investments are transmitted to terminals located on the premises of subscribing customers maintaining cash management accounts with the bank. Each customer's terminal is able to communicate with the bank's data processing facility through a standard telecommunications link or other communication channel. When a customer accesses the investment system of the present invention to view the offered investments stored in the inventory file, a transaction file pertaining to the customer is opened in anticipation of the need to record certain data identifying the investment purchase transaction. After viewing the maturity periods and rates of return available from the bank, the customer decides whetner or not he wishes to invest. If the customer decides not to invest, the previously opened transaction file is closed, and the system waits for the next investment transaction to occur. If the customer chooses to invest, the transaction data, i.e., the maturity period, rate of return and the amount of funds to be invested are entered at the customer's terminal, and then transmitted over the communications link to the bank's data processing facility. Upon receipt of this data, the system scans the inventory file to determine whether there is sufficient inventory available to match the investment purchase transaction. If there is, the system earmarks for transfer to a safekeeping account sufficient, specific whole and/or fractionalized undivided interests in selected securities in inventory to match the amount invested by the customer.

Upon completion, the investment transaction is confirmed, and the customer's file is updated to reflect the transaction. Thereafter, a customer designated demand deposit account maintained with the bank to cover purchase transactions is debited. When an investment ultimately matures, the customer's designated account is then credited to reflect payment by the bank, and the customer's file is again updated to reflect the termination of the investment.

THE DRAWINGS

FIG. 1 is a block diagram of the hardware for carrying out the data processing and operational methodology of the cash investment system of the present invention.

FIG. 2 is the portion of the system schematic flowchart depicting the data processing and operational methodology for the improved investment system of the present invention which depicts the data processing for the selection and storage of the interest bearing securities and instruments in the system's inventory file, and the access by a customer of the investments stored in this file for viewing.

FIG. 3 is the portion of the system schematic flowchart depicting the data processing for the closing of a customer's file when he chooses not to invest, the offering of an alternative investment amount when the amount of inventory available is insufficient to cover the amount of funds a customer wishes to invest and for the addition of inventory to the inventory file in response to this insufficiency.

DESCRIPTION OF THE PREFERRED EMBODIMENT

Figure 1:
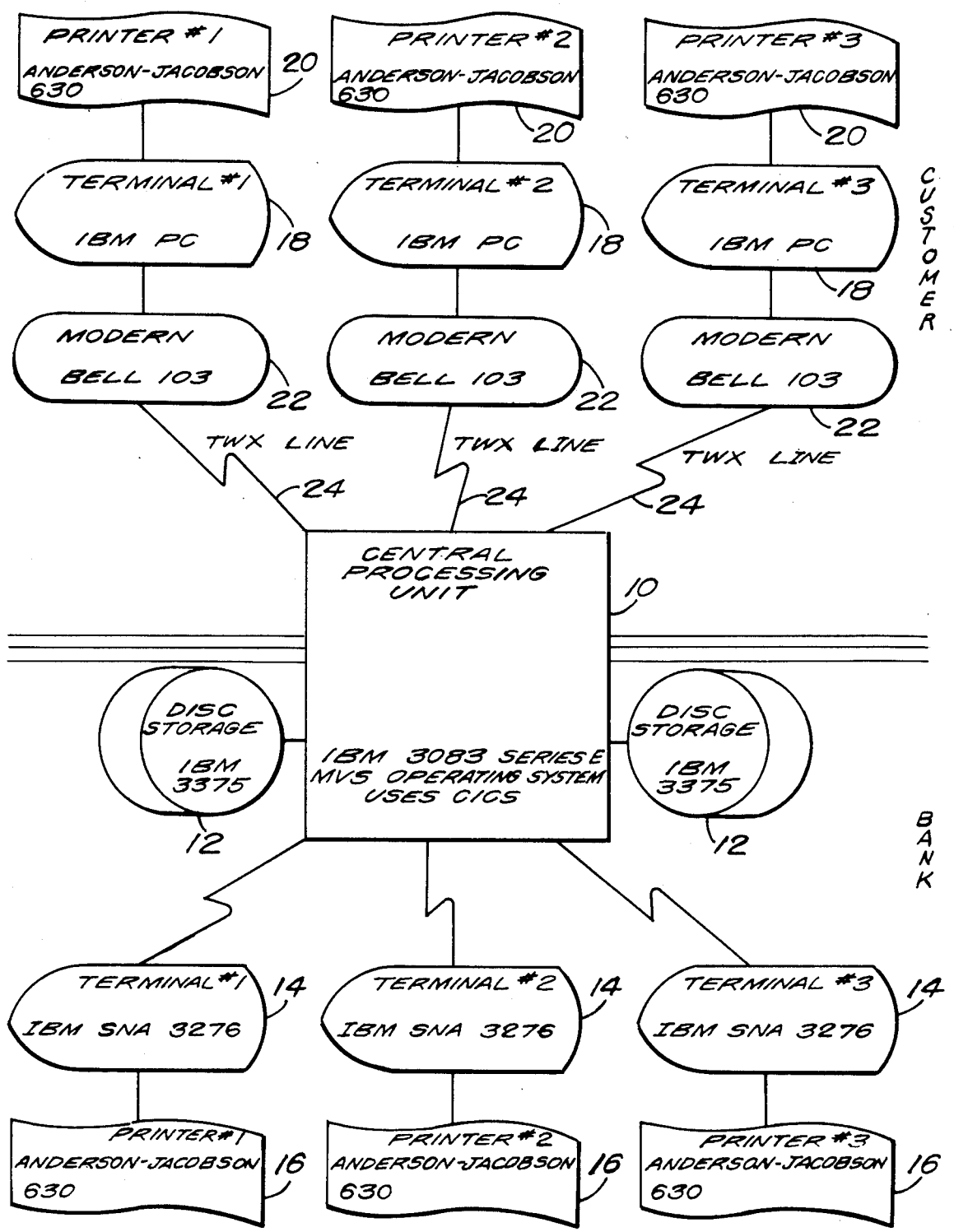

The hardware for the preferred embodiment of the present invention is shown in FIG. 1. The heart of the system hardware is a central processing unit (CPU) 10 which is typically part of a bank's data processing facility. This central processing unit performs the data processing steps set forth in the inventory file and customer file flow paths of FIGS. 2-8. Very often, this central processing unit will be a main-frame computer capable of accommodating the large number of transactions and corresponding amounts of data which the system will typically handle, although it is also possible that a mini-computer system having the necessary data processing capabilities may also be used. One example of a central processing of the former type which can be used to practice the present invention is the IBM 3083 Series E.

Coupled to the central processing unit are a plurality of storage units 12 which are used to store the data generated for the inventory and customer files. Typically, such units are hard discs capable of storing large amounts of data. One example of a storage unit of this type is the IBM 3375.

A plurality of terminals 14 and printers 16 are the means by which various bank employees enter data in, receive data from, and otherwise communicate with the investment system operating program and storage files resident in CPU 10 and disc storage units 12. Illustrative of these terminals and printers are the IBM SNA 3276 terminal and the Anderson-Jacobson 630 printer. Similarly, a plurality of terminals 18 and printers 20 located at various customer facilities are the means by which customers communicate with the investment system operating program to view offered investments and initiate purchase transactions. Typically, each of these terminals includes a CRT monitor and a keyboard, and is connected to one of the printers 16 so that hard copy of information displayed on the CRT or processed at the terminal can be obtained. Illustrative of these terminals and printers are the IBM PC and monitor and the Anderson-Jacobson 630 printer. These components will be discussed hereinafter in further detail in connection with the description of the data processing and operational steps set forth in the flow chart of FIGS. 2-8.

The flowchart of FIGS. 2-8 is divided into three interrelated data processing and operational flow paths which typically occur in practicing the present invention. The first of tnese flow paths, designated "inventory file", represents internal bank operations pertaining to the selection of the interest rates to be offered for the various investment maturities, the selection of discounted and interest bearing securities and instruments for the inventory underlying the offered investments, the assignment of inventory to customer safekeeping accounts to match investment purchase transactions initiated by such customers, and changes in the inventory selected to underly the offered investments.

The second flow path, designated "customer file", also represents internal bank operations; however, these operations pertain to steps taken by the bank to identify customers seeking to access the investment system, and to administer investment accounts for its customers for recording data reflecting past and present purchase transactions.

The last flow path, designated "transactor," shows the interaction between a customer (transactor) and the system when the customer accesses the system to review the invenstments offered by the bank, and decides whether or not to make an investment.

Figure 2:
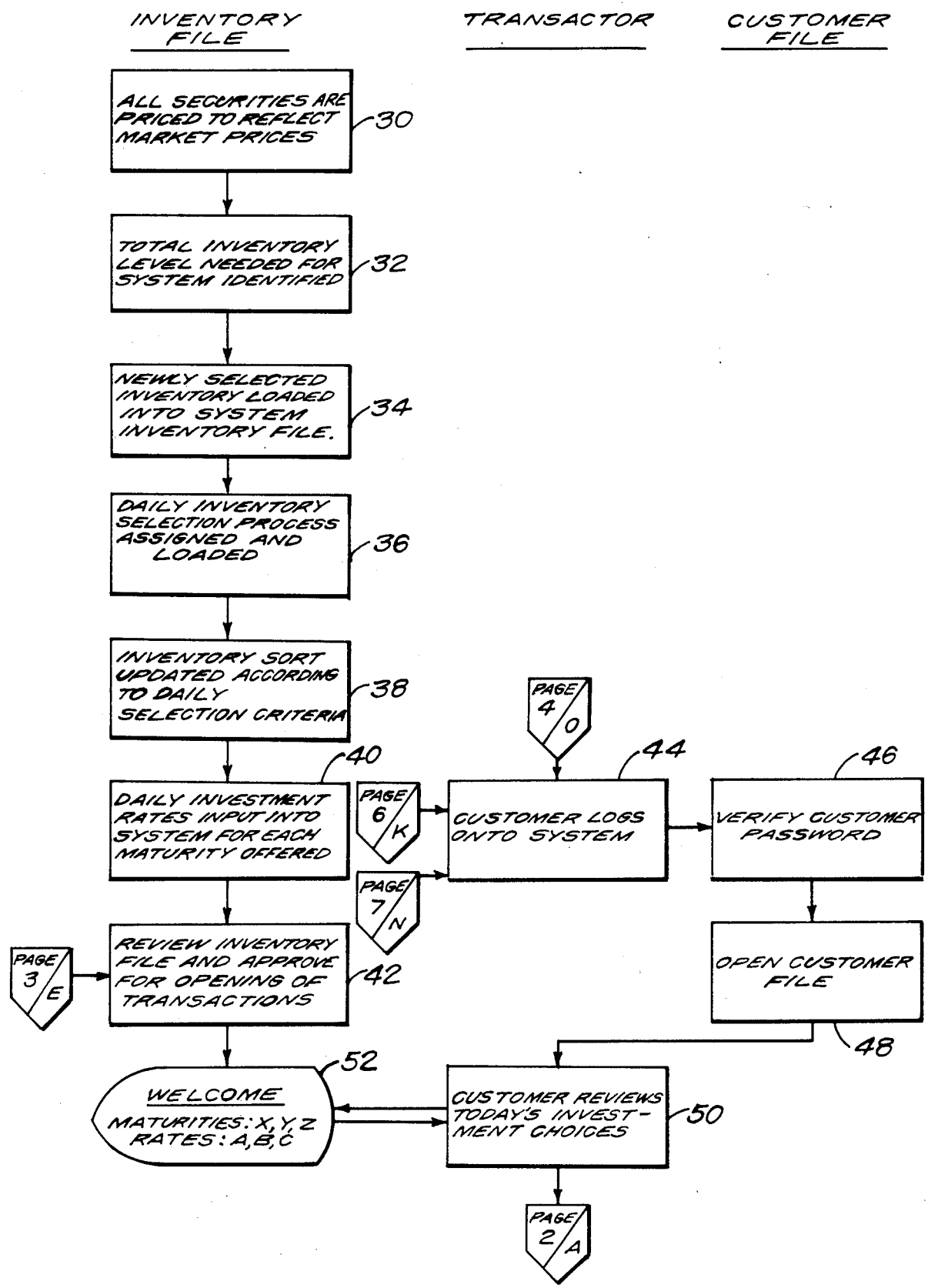

Refering now to FIG. 2, shown therein are the operational flow and data processing steps performed by the bank in specifying the maturities and rates of return of the investments that will be offered through the investment system and in selecting the securities and instruments underlying such investments that will be placed in inventory.

Referring now to the inventory file flow shown in FIG. 2, in the first step 30 of the securities selection process the bank personnel responsible for the sale of securities, typically the bank's dealership department, prices the securities which may be selected for inventory to reflect market prices. This pricing step helps the bank to ascertain which securities are financially more advantageous to use. At step 32, the total inventory level anticipated for the succeeding business day is determined. This level is determined with the help of a number of factors, including past customer demand for investments, the activity history of the various offered investments and the perceived future demand for such investments based on business cycle factors, such as seasonal funding requirements dictated by the payment of dividends, or the like. Once the level of inventory is determined, the specific securities and instruments which will comprise the inventory are selected and loaded into the system at step 34. In the preferred embodiment, data identifying such securities are loaded into the inventory file resident in storage units 12. Such inventory data are entered into CPU 10, FIG. 1, for transfer to units 12 by means of an operator, who keys in the relevant data through the keyboard of one of the terminals 14.

The loading of inventory into the system is done prior to the start of each business day. Typically, it is done after business hours on the day prior to the day for which the inventory is selected. The criteria used for selection may include such factors as security type, the tenor or maturity of the securities available, and whether or not a given security has been previously fractionalized to match past investment purchase transactions. At step 36 the specifically selected criteria are then loaded into the system for use in subsequent selections.

Once the inventory is entered into the system, CPU 10 performs a sort of the inventory by security type and maturity (step 38). This sort allows a quicker response time for the execution of purchase transactions to be achieved by placing the securities in an order in which the bank prefers to sell them. For example, because it costs a bank money to maintain securities in its own account, the securities may be sorted so that those which cost the most to carry will be sold first. After the inventory has been stored in the inventory file resident in system storage units 12, the investments being offered, identified by their rates of return and maturity periods, are then stored in the inventory file located in storage units 12 (Step 40). These rates and maturities are generally different from those of the underlying securities. Once this step is completed, a final system check at step 42 is made, after which the system is opened for purchase transactions.

Referring now to the transactor and customer file flow paths of FIG. 2, if a customer wishes to invest idle funds on hand, the customer may view the investments currently being offered by accessing the inventory file using one of terminals 18, FIG. 1, located at his facility. In the preferred embodiment of the present invention, each of terminals 18 is connected to the system's central processing unit 10 through a telecommunications link consisting of a modem 22, coupled to terminal 18, and TWX line 24 interconnecting the modem and CPU 10.

Referring again to FIG. 2, a customer seeking to view the offered investments first logs onto the system (step 44) using an appropriate password. Using terminal 18's keyboard, the customer enters his password and transmits this password to central processing unit 10 through corresponding modem 22 and twx line 24. Upon receipt of this password, the central processing unit, at step 46, seeks to verify it. If it succeeds, it opens the customer's file at step 48 in anticipation of subsequently storing certain transaction data therein. Thereafter, CPU 10 accesses the inventory file stored in the storage units 12 to obtain investment data describing the investments being offered, after which it transmits the data to terminal 18 through corresponding modem 22 and TWX line 24. Upon receipt of this data, terminal 18 displays the investments being offered on its CRT for review by the customer, as reflected by steps 50 and 52 of the flowchart. The investment information displayed on the CRT includes investment maturities and corresponding interest rates.

Figure 3:
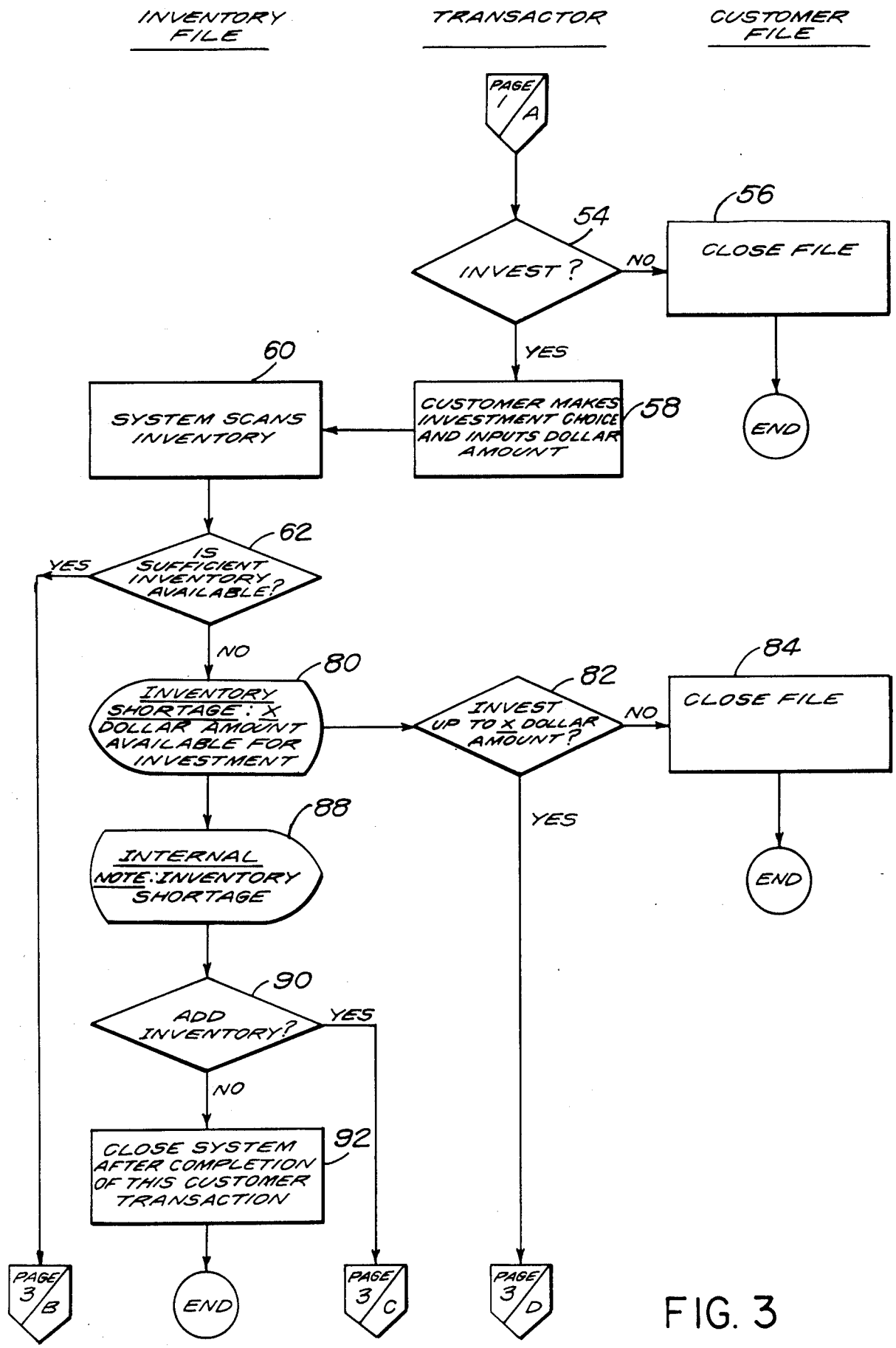
Figure 4:
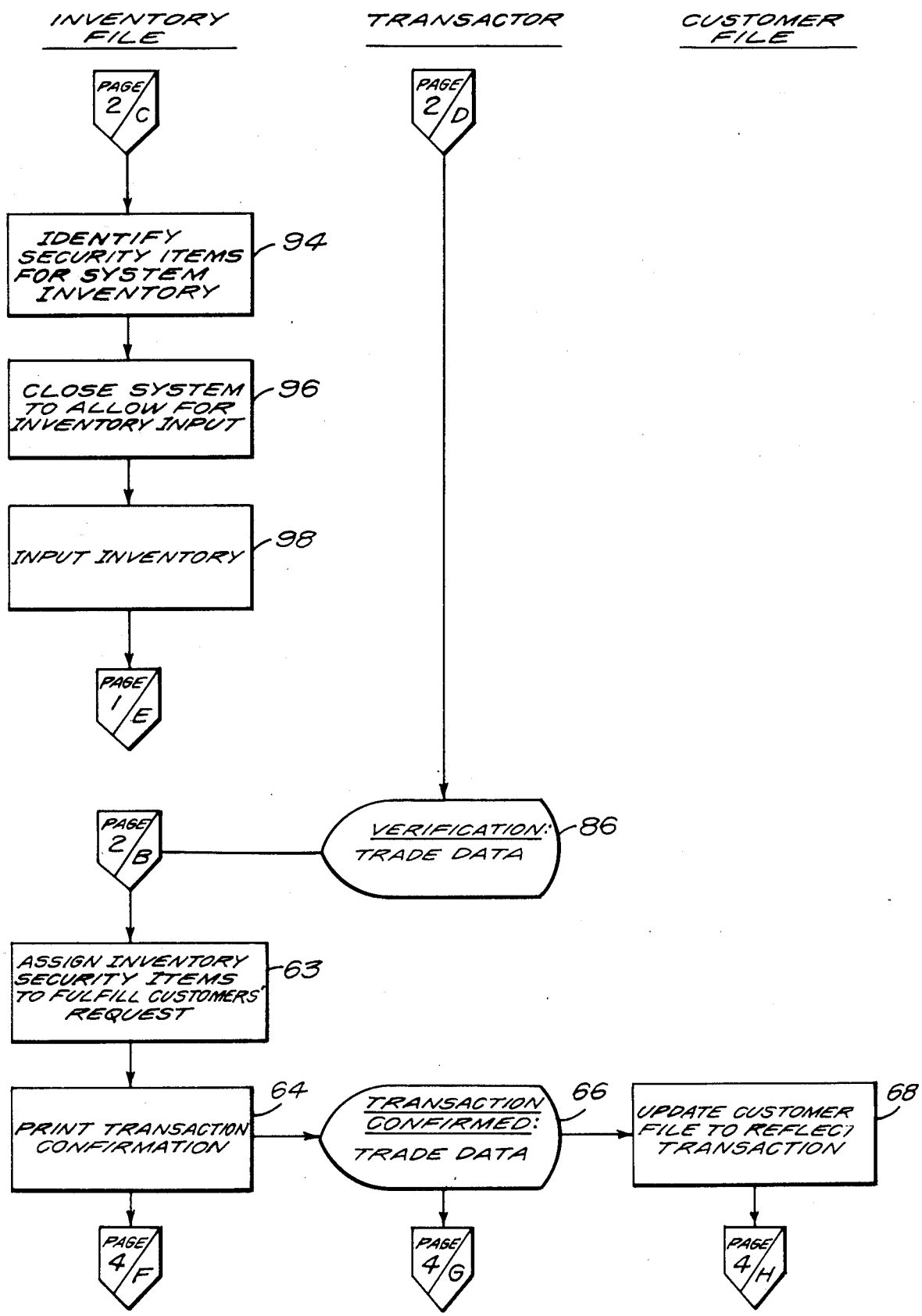
FIG. 4 is that portion of the system schematic flowchart depicting further data processing for adding inventory to the inventory file, and the data processing for the assignment of inventory to cover an investment vehicle purchase transaction and the confirmation of a purchase transaction.
Figure 5:
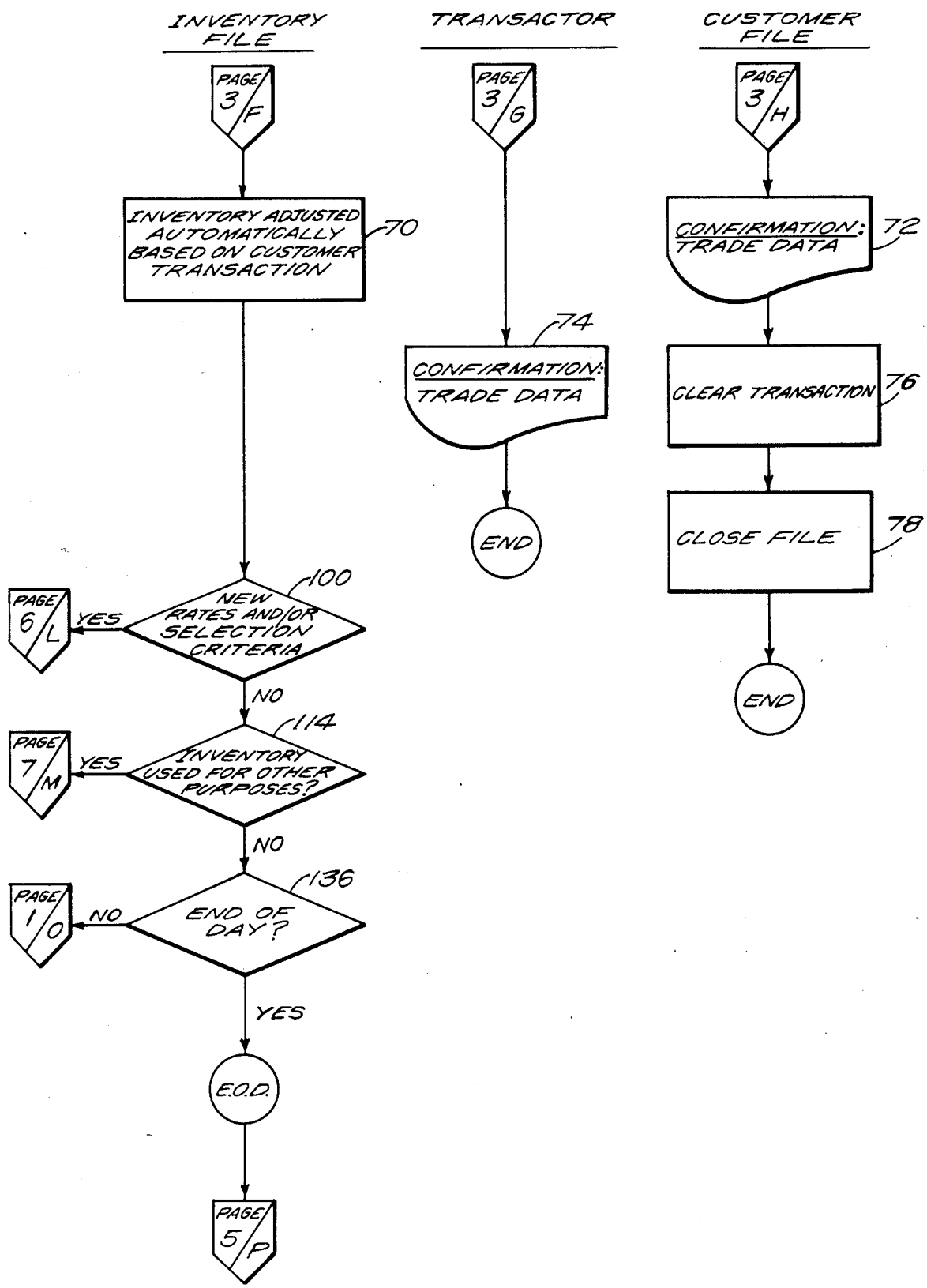
FIG. 5 is that portion of the system schematic flowchart depicting further data processing for the confirmation of a purchase transaction, and the data processing for the initiation of a series of in-bank functions.

Referring now to FIG. 3, displayed with the offered investments is a prompt which asks the customer whether or not he wishes to invest (step 54). If the customer chooses not to invest, he responds to the prompt by entering a "NO" or its equivalent through the keyboard of his terminal. This causes CPU 10 at step 56 to close the previously opened customer file. Alternatively, if the customer chooses to purchase an investment, he responds by entering a "YES" or its equivalent through the keyboard, along with certain transaction data, including the maturity and corresponding interest rate selected and the amount to be invested (step 58). Thereafter, the customer causes terminal 18 to transmit this data to CPU 10 through corresponding modem 22 and TWX line 24. Upon receipt of this transaction data, a scan of the inventory stored in the inventory file is initiated at step 60 to determine at step 62 whether there is sufficient inventory available to match the amount invested by the customer. Referring now to FIGS. 4 and 5 in conjunction with FIG. 3, if it is determined that there is sufficient inventory available, system flow branches to step 63 shown in FIG. 4, whereupon whole and/or fractionalized undivided interests in selected securities are assigned to match the amount invested by the customer. At step 64 the customer's purchase transaction is confirmed by CPU 10 transmitting certain trade data identifying the transaction over TWX line 24 and modem 22 to customer terminal 18 for display on its monitor (step 66). This trade data consists of the amount invested, the maturity and rate of return selected and the securities assigned to match the customer's purchase transaction. Commensurate with this, the previously opened customer file stored in storage units 12 is accessed and updated at step 68 to reflect the customer's transaction by writing the trade data forwarded to the customer therein. Thereafter, the inventory stored in the inventory file is adjusted at step 70 (FIG. 5) to reflect the assignment of securities to match the customer's purchase transaction. A confirmation of the stored trade data is displayed on the CRT of one of bank terminals 14 to allow the appropriate bank operator to make a hard copy thereof (step 72) using the terminal's associated printer 16. CPU 10 then transmits the trade data to the customer's terminal 18 to allow him to produce a hard copy thereof using the terminal's associated printer 20 (step 74). Upon completion of this, the transaction is cleared and the previously opened customer's file is closed at steps 76 and 78, respectively.

If a customer initiates a purchase transaction, and a scan of the inventory file shows that there is insufficient inventory to match the transaction, CPU 10 transmits a message to terminal 18 for display on its CRT that a specific dollar amount of investment, less than the amount entered by the customer, is available (step 80 of FIG. 3). A prompt asking whether the customer wishes to purchase an amount up to the dollar amount available is also displayed. If the customer chooses at step 82 not to invest, system flow branches to step 84, whereupon the previously opened customer file is closed. Alternatively, if the customer chooses at step 82 to purchase a lesser amount, system flow branches to step 86 of FIG. 4 where the impending trade is verified for the customer by forwarding the trade data pertaining to the transaction to the customer's terminal and displaying it on its CRT. Thereafter, the system flow proceeds to previously described step 62 where the appropriate amount of inventory to match the transaction is assigned. The transaction is then confirmed and the customer's file updated in the manner previously described for the situation where there was sufficient inventory to match the customer's purchase transaction.

Referring again to FIG. 3, at the time the customer is informed that there is insufficient inventory to match his purchase transaction, the inventory shortage is also displayed on the CRT of bank terminal 14 (step 88), along with a query directed to the appropriate bank personnel as to whether or not additional inventory should be added. The bank employee viewing the query enters a response through the keyboard of terminal 14. If he responds at step 90 that inventory is not to be added, then the purchase transaction in progress is completed, and thereafter, the system is closed down (step 92). Alternatively, if the bank employee enters a response at step 90 indicating that inventory is to be added, system flow branches to step 94 (shown in FIG. 4) where additional security items are identified for inventory in a manner similar to that previously described. To allow the inventory to be stored in the inventory file (step 96), the system is temporarily closed down (step 98), after which, operational flow branches back to previously described step 42 where a review of the file is again made for approval prior to subsequent opening of the system for the handling of additional purchase transactions (step 52).

Figure 7:
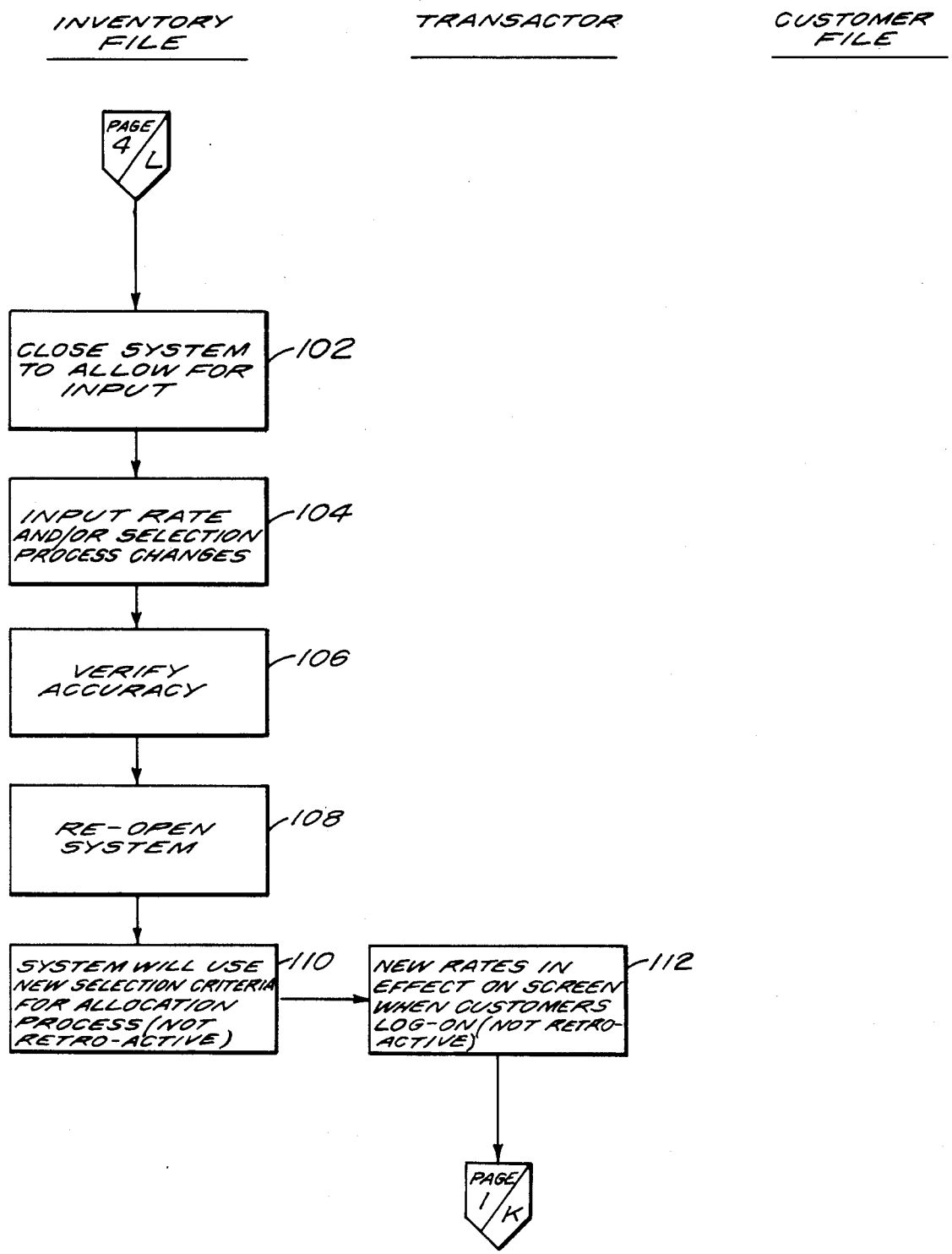
FIG. 7 is a subroutine of the system schematic flowchart depicting the data processing for adding inventory to the inventory file in response to the introduction of new rates and inventory selection criteria.
Figure 8:
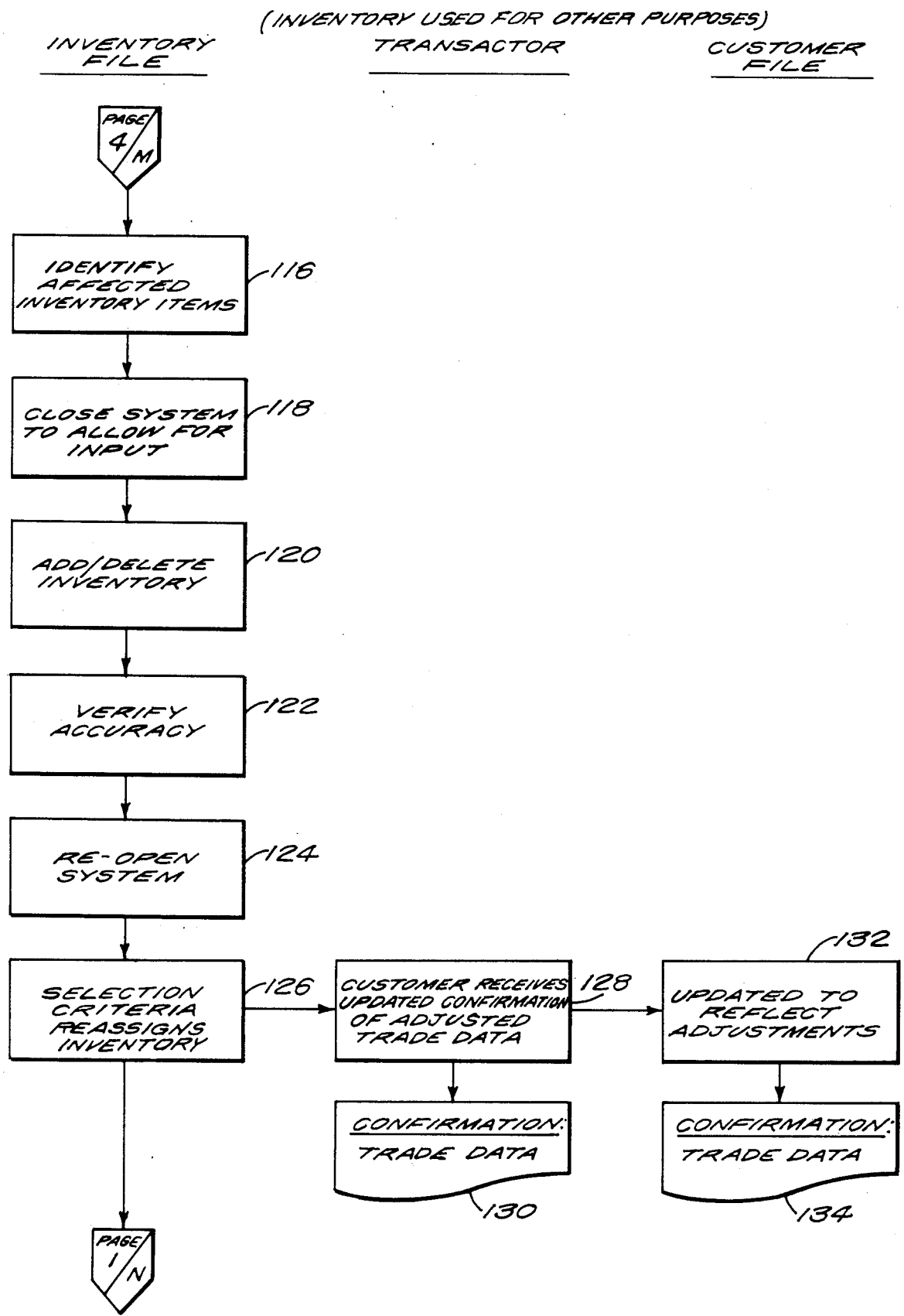
FIG. 8 is a subroutine of the system schematic flowchart depicting the data processing for the adding of inventory to the existing inventory file in response to the use of inventory for purposes other than matching purchases of customers, and for the reassignment of inventory to cover previously completed trades.

Referring now to FIG. 5, where market conditions or the like make it necessary or desirable to change the rates of the investments being offered, or the criteria used to assign the underlying securites and instruments to match investment purchases (step 100), system flow branches to step 102, shown in FIG. 7, whereupon the system is closed to allow the input of new rates and/or assignment criteria to be input (step 104). The information identifying the securities and/or the assignment criteria is entered into the inventory file stored by the appropriate bank employee via any one of terminals 14. Once this input of data is completed, a verification of its accuracy is performed at step 106, after which the system is reopened at step 108 with the new rates and assignment criteria in effect (steps 110 and 112). Thereafter, system flow branches back to previously described step 44 of FIG. 2 to await a new purchase transaction.

Referring again to FIG. 5, if no new rates and/or allocation criteria are to be used by the system, operational flow falls through to step 114 to determine whether any of the securities previously stored in inventory or assigned to match previous purchase transactions have been used for other purposes. Typically, this will occur when it is no longer financially advantageous for the bank to hold such securities in view of changes in market conditions. Where a portion of the underlying or assigned inventory has been used for other purposes, system flow branches to step 116 (FIG. 8) where the affected inventory items are identified. Upon their identification, the system is closed (step 118) to allow the affected securities to be deleted and substitute securities to be added (step 120). Here again, the data identifying the securities deleted and added is entered into the inventory file stored in disc storage units 12 by the appropriate bank employee via any one of bank terminals 14 communicating with CPU 10. Upon completion of this task an accuracy verification is performed at step 122, and if the entered data is accurate, the system is reopened at step 124. Upon reopening, the previously entered selection criteria for assigning inventory to match purchase transactions is used to assign substitute securities for those deleted securities previously used to match purchase transactions (step 126). In connection with this reassignment, each customer having an investment outstanding is forwarded an updated confirmation displaying his original trade data and the change in assignment (step 128), a hard copy of which is printed by the customer's printer 20 at step 130. Simultaneous with this, each affected customer file stored in disc storage units 12 is updated to reflect the adjustment in trade data (step 132). A hard copy confirmation is then printed for the bank's records at step 134 by one of printers 16.

Figure 6:
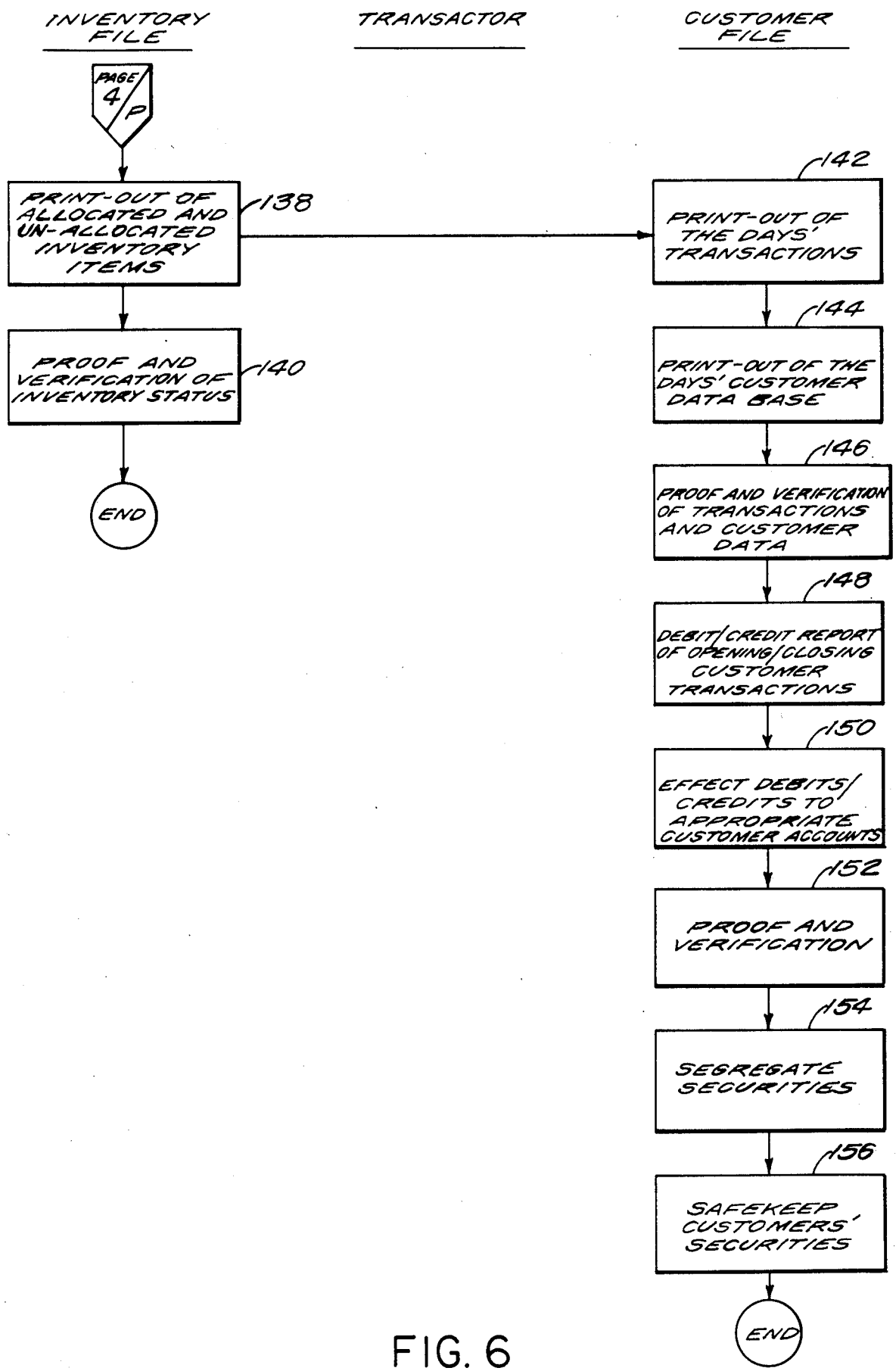
FIG. 6 is that portion of the system schematic flowchart depicting the data processing for the performance of in-bank functions concerning inventory and customer files and for the debiting and crediting of customer files to reflect the day's transactions.

Referring again to FIG. 5, when the end of a business day has been reached, system flow stops branching from step 136 to step 44 to process new transactions, and falls through to step 138 of the end of day routine shown in FIG. 6. At step 138 a printout of all allocated and unallocated securities and instruments stored in inventory is made to allow a proof and verification of their status to be made (step 140) by the appropriate bank personnel. Simultaneously, a printout on one of the bank's printers 16 is made of all the purchase transactions performed during the day and of all the customers initiating purchase transactions during that day (steps 142 and 144). A proof and verification between the transactions and the customers is then performed in preparation for the generation at step 148 of a debit/credit report showing which designated customer accounts are to be debited and/or credited to reflect new purchases of investments and the maturing of previously made investments. Based on this report, a debiting and crediting of appropriate customer accounts is performed at step 150 for the day. A proof and verification of these debits and credits is then performed at step 152, after which the various securities assigned to match the previous and present purchase transactions are segregated and placed in a safe facility (steps 154 and 156). Finally, the system is maintained in a closed condition until the next business day, at which time the system is prepared for reopening according to the procedure set forth in FIG. 2 of the flowchart.

It is to be understood that a number of variations may be made in the invention without departing from its spirit and scope. The terms and expressions which have been employed in the foregoing description are used in a descriptive and not a limiting sense, and no intention of excluding equivalents of the invention described and claimed is made.

What is claimed is:

1. An online interactive investment processing system linking an inventory of investments with customers at various remote locations comprising:
    means for storing a plurality of securities and instruments, and a plurality of investment vehicles, each of said inventment vehicles having a pre-determined maturity and offering a pre-determined rate of interest,
    a plurality of first means for accessing said storing means and reviewing said plurality of investment vehicles, and for initiating purchases of said investment vehicles by said customers,
    processing means, coupled to said means for storing and said first means, responsive to the initiation of said investment vehicle purchases by assigning at least one fractionalized, undivided interest or at least one whole and at least one fractionalized, undivided interest in specifically identified securities and/or instruments of said plurality of securities and instruments to match each of said investment vehicle purchases, and for confirming each of said investment vehicle purchases, and
    means, coupled to said processing means, for recording said investment vehicle purchases and said assignment of said specifically identified securities and/or instruments.

2. A system as recited in claim 1 wherein said storing means is accessible by said plurality of first means at conventional and unconventional selling times of a day so that said customers can initiate said investment vehicle purchases at said selling times of said day.

3. A system as recited in claim 2 wherein said processing means completes said investment vehicle purchases automatically without intervention by a salesperson.

4. A system as recited in claims 1 or 2 further comprising a safe facility for holding said assigned securities and/or instruments for said customers initiating said investment vehicle purchases.

5. A system as recited in claim 4 wherein said plurality of securities and/or instruments stored in said storing means are interest bearing and/or discounted.

6. An online interacitve investment processing system linking an inventory of investments with customers at various remote locations comprising:
    a storage unit for storing an inventory file comprised of data identifying a plurality of securities and instruments, and a plurality of investment vehicles, each of said investment vehicles having a predetermined maturity and offering a pre-determined rate of interest,
    a plurality of devices for accessing said inventory file so that said plurality of investment vehicles can be reviewed, and for initiating purchases of said investment vehicles by said customers,
    a computer responsive to the initiation of said investment vehicle purchases by assigning at least one at least fractionalized, undivided interest or at least one whole and one fractionalized undivided interest in specifically identified securities and/or instruments of said plurality of securities and instruments to match each of said investment vehicle purchases, and for confirming each of said investment vehicle purchases,
    said storage unit also storing a customer file comprised of date recording said investment vehicle purchases, said assigned securities and/or instruments and the names of said customers initiating said purchases, and
    wherein each of said investment vehicle purchases are initiated by transmitting transaction data identifying an investment vehicle having a desired pre-determined maturity and a corresponding pre-determined rate of interest and an amount of funds to be used for the purchase of said investment vehicle to said computer from one of said devices.

7. An online interactive investment processing system linking an inventory of investments with customers at various remote locations comprising:
    means for storing a plurality of securities and instruments, and a plurality of investment vehicles, each of said investment vehicles having a pre-determined maturity and offering a pre-determined rate of interest,
    a plurality of first means for accessing said storing means and reviewing said plurality of investment vehicles, and for initiating purchases of said investment vehicles by said customers,
    processing means coupled to said means for storing and said first means, responsive to the initiation of said investment vehicle purchases by assigning at least one fractionalized, undivided interest or at least one whole and at least one fractionalized, undivided interest in specifically identified securities and/or instruments of said plurality of securities and instruments to match each of said investment vehicle purchases, and for confirming each of said investment vehicle purchases,
    means coupled to said processing means, for recording said investment vehicle purchases and said assignment of said specifically identified securities and/or instruments, and
    wherein said storing means is accessible by said plurality of first means at conventional and unconventional selling times of a day so that said customers can initiate said investment vehicle purchases at said selling times of said day, and
    wherein said processing means completes said investment vehicle purchases automatically without intervention by a salesperson, and
    wherein each of said investment vehicle purchases is initiated by one of said first means sending to said processing means transaction data comprising a selection of one of said investment vehicles having a desired pre-determined maturity and corresponding pre-determined rate of interest and an indication of an amount of funds to be used for the purchase of said selected investment vehicle.

8. A system as recited in claim 7; further comprising means, coupled to said processing means, for debiting a specified customer deposit account to cover each of said investment vehicle purchases and means, coupled to said processing means, for crediting a specified customer deposit account when each of said investment vehicles matures, and second means, coupled to said processing means, for recording said debits and credits.

9. A system as recited in claim 7 further comprising means, coupled to said processing means, for substituting other securities and/or instruments for those of said assigned securities and/or instruments used for purposes other than matching said investment vehicle purchases.

10. An online interactive investment processing system linking an inventory of investments with customers at various remote locations comprising:
 a storage unit for storing an inventory file comprised of data identifying a plurality of securities and instruments, and a plurality of investment vehicles, each of said investment vehicles having a predetermined maturity and offering a pre-determined rate of interest,
 a plurality of devices for accessing said inventory file so that said plurality of investment vehicles can be reviewed, and for initiating purchases of said investment vehicles by said customers, and
 a computer responsive to the initiation of said investment vehicle purchases by assigning at least one fractionalized, undivided interest or at least one whole and at least one fractionalized undivided interest in specificallly identified securities and/or instruments of said plurality of securities and instruments to match each of said investment vehicle purchases, and for confirming each of said investment vehicle purchases,
 said storage unit also storing a customer file comprised of data recording said investment vehicle purchases, said assigned securities and/or instruments and the names of said customers initiating said purchases.

11. A system as recited in claim 10 further comprising a plurality of telecommunications links linking said storage unit to said plurality of devices, each of said telecommunication links allowing a corresponding one of said devices to acess said inventory file at conventional and unconventional selling times of a day so that investment vehicle purchases can be executed during said selling times without the need of a salesperson.

12. A system as recited in claim 11 further comprising a safe facility for holding said assigned securities and/or instruments for each of said customers initiating said investment vehicle purchases so that said assigned securities and/or instruments are not delivered to said customers.

13. An online interactive investment processing systems linking an inventory of investments with customers at various remote locations comprising:
 a storage unit for storing an inventory file comprised of data identifying a plurality of securities and instruments, and a plurality of investment vehicles, each of said investment vehicles having a predetermined maturity and offering a pre-determined rate of interest,
 a plurality of devices for accessing said inventory file so that said plurality of investment vehicles can be reviewed, and for initiating purchases of said investment vehicles by said customers, and
 a computer responsive to the initiation of said investment vehicle purchases by assigning at least one fractionalized, undivided interest or at least one whole and at least one fractionalized undivided interest in specifically identified securities and/or instruments of said plurality of securities and instruments to match each of said investment vehicle purchases, and for confirming each of said investment vehicle purchases,
 said storage unit also storing a customer file comprised of data recording said investment vehicle purchases, said assigned securities and/or instruments and the names of said customers initiating said purchases,
 a plurality of telecommunications links linking said storage unit to said plurality of devices, each of said telecommunication links allowing a corresponding one of said devioes to access said inventory file at conventional and unconventional selling times of a day so that investment vehicle purchases can be executed during said selling times without the need of a salesperson,
 a safe facility for holding said assigned securities and/or instruments for each of said customers initiating said investment vehicle purchases so that said assigned securities and/or instruments are not delivered to said customers, and
 means, coupled to said computer for substituting other securities and/or instruments for those of said assigned securities and/or instruments used of purposes other than matching investment vehicle purchases.

14. An online interactive investment processing system linking an inventory of investments with customers at various remote locations comprising:
 a storage unit for storing an inventory file comprised of data identifying a plurality of securities and instruments, and a plurality of investment vehicles, each of said investment vehicles having a predetermined maturity and offering a pre-determined rate of interest,
 a plurality of devices for accessing said inventory file so that said plurality of investment vehicles can be reviewed, and for initiating purchases of said investment vehicles by said customers,
 a computer responsive to the initiation of said investment vehicle purchases by assigning at least one fractionalized, undivided interest or at least one whole and at least one fractionalized undivided interest in specifically identified securities and/or instruments of said plurality of securities and instruments to match each of said investment vehicle purchases, and for confirming each of said investment vehicle purchases,
 said storage unit also storing a customer file comprised of data recording said investment vehicle purchases, said assigned securities and/or instruments and the names of said customers initiating said purchases, and
 wherein said computer confirms each of said investment vehicle purchases by transmitting trade data identifying a maturity and rate of return for each of said investment vehicles purchased, an amount of funds invested and the securities and/or instruments assigned to match said investment vehicles purchased.

15. A method of interactively processing investments selected by customers at various remote locations from an inventory of investments linked with said customers comprising:
 storing a plurality of interest bearing securities and/or instruments and a plurality of investment vehicles in an inventory file, each of said investment vehicles having a pre-determined maturity and offering a pre-determined rate of interest,
 providing access by customers to said inventory file storing means at conventional and unconventional selling times of the day so that said customers can view said plurality of investment vehicles during said selling times and, if desired, initiating purchases of said investment vehicles at said conventional and unconventional selling times of said day, assigning in response to the initiation of each of said investment vehicle purchases at least one fractionalized, undivided interest or at least one whole and at least one fractionalized, undivided interest in specifically identified securities and/or instruments of said plurality of securities and instruments to match each of said investment vehicle purchases, confirming each of said investment vehicle purchases to said customers initiating said purchases, and storing said trade data in a customer file, and holding for said customers initiating said purchases said assigned securities and/or instruments in a safe facility.

16. A method as recited in claim 15 further comprising, after said step of confirming, the steps of debiting a specified deposit account of each of said customers initiating investment vehicle purchases to cover each of said investment vehicle purchases, and crediting said specified deposit accounts upon said purchased investment vehicles maturing, and storing said debits and credits in said customer file.

17. A method as recited in claims 15 or 16 wherein said inventory file is directly accessible by said communicating means so that said investment vehicles can be purchased without the need for intervention by a salesperson.

18. A method of interactively processing investments selected by customers at various remote locations from an inventory of investments linked with said customers comprising:

storing a plurality of interest bearing securities and/or instruments and a plurality of investment vehicles in an inventory file, each of said investment vehicles having a pre-determined maturity and offering a pre-determined rate of interest, providing access by customers to said inventory file storing means at conventional and unconventional selling times of a day so that said customers can view said plurality of investment vehicles during said selling times and, if desired, initiating purchases of said investment vehicles at said conventional and unconventional selling times of said day, assigning in response to the initiation of each of said investment vehicle purchases at least one fractionalized, undivided interest or at least one whole and at least one fractionalized, undivided interest in specifically identified securities and/or instruments of said plurality of securities and instruments to match each of said investment vehicle purchases, confirming each of said investment vehicle purchases to said customers initiating said purchases, and storing said trade data in a customer file, substituting other securities and/or instruments for said assigned securities and/or instruments when said assigned securities and/or instruments are used for purposes other than matching said investment vehicle purchases, and holding for said customers initiating said purchases said assigned securities and/or instruments in a safe facility.

19. A method as recited in claim 18 further comprising, after said step of confirming, the steps of debiting a specified deposit account of each of said customers initiating investment vehicle purchases to cover each of said investment vehicle purchases, and crediting said specified deposit accounts upon said purchased investment vehicles maturing, and storing said debits and credits in said customer file.

20. A method of interactively processing investments selected by customers at various remote locations from an inventory of investments linked with said customers comprising:

storing a plurality of interest bearing securities and/or instruments and a plurality of investment vehicles in an inventory file, each of said investment vehicles having a pre-determined maturity and offering a pre-determined rate of interest, providing access by customers to said inventory file storing means at conventional and unconventional selling times of a day so that customers can view said plurality of investment vehicles during said selling times and, if desired, initiating purchases of said investment vehicles at said conventional and unconventional selling times of said day by entering transaction data identifying an investment vehicle having a desired pre-determined maturity and corresponding pre-determined rate of interest and an amount of funds to be used for the purchase of said investment vehicle, assigning in response to the initiation of each of said investment vehicle purchases at least one fractionalized, undivided interest or at least one whole and at least one fractionalized, undivided interest in specifically identified securities and/or instruments of said plurality of securities and instruments to match each of said investment vehicle purchases, confirming each of said investment vehicle purchases to said customers initiating said purchases, and storing said trade data in a customer file, and holding for said customers initiation said purchases said assigned securities and/or instruments in a safe facility.

21. A method as recited in claim 20 further comprising, after said step of confirming, the steps of debiting a specified deposit account of each of said customers initiating investment vehicle purchases to cover each of said investment vehicle purchases, and crediting said specified deposit accounts upon said purchased investment vehicles maturing, and storing said debits and credits in said customer file.

22. A method of interactively processing investments selected by customers at various remote locations from an inventory of investments linked with said customers comprising:

storing a plurality of interest bearing securities and/or instruments and a plurality of investment vehicles in an inventory file, each of said investment vehicles having a pre-determined maturity and offering a pre-determined rate of interest, providing access by customers to said inventory file storing means at conventional and unconventional selling times of a day so that said customers can view said plurality of investment vehicles during said selling times and, if desired, initiating purchases of said investment vehicles at said conventional and unconventional selling times of said day, assigning in response to the initiation of each of said investment vehicle purchases at least one fractionalized, undivided interest or at least one whole and at least one fractionalized, undivided interest in specifically identified securities and/or instruments of said plurality of securities and instruments to match each of said investment vehicle purchases, confirming each of said investment vehicle purchases to said customers initiating said purchases by forwarding trade data to said customers identifying a maturity and rate of return for each of said investment vehicles purchased, an amount of funds invested and the securities and/or instruments assigned to match said investment vehicles purchased, and storing said trade data in a customer file, and holding for said customers initiating said purchases said assigned securities and/or instruments in a safe facility.

23. A method as recited in claim 22 further comprising, after said step of confirming, the steps of debiting a specified deposit account of each of said customers initiating investment vehicle purchases to cover each of said investment vehicle purchases, and crediting said specified deposit accounts upon said purchased investment vehicles maturing, and storing said debits and credits in said customer file.

* * * * *